(12) United States Patent
Lane et al.

(10) Patent No.: US 7,221,258 B2
(45) Date of Patent: May 22, 2007

(54) HIERARCHICAL ELECTRONIC WATERMARKS AND METHOD OF USE

(76) Inventors: Kathleen Lane, 10695 Magdalena Ave., Los Altos Hills, CA (US) 94024; William Lane, 10695 Magdalene Ave., Los Altos Hills, CA (US) 94024; Roger Stewart, 16575 Oakview Cir., Morgan Hill, CA (US) 95037

( * ) Notice: Subject to any disclaimer, the term of this patent is extended or adjusted under 35 U.S.C. 154(b) by 365 days.

(21) Appl. No.: 10/731,725

(22) Filed: Dec. 9, 2003

(65) Prior Publication Data

US 2005/0007236 A1    Jan. 13, 2005

(51) Int. Cl.
| | |
|---|---|
| H04Q 5/22 | (2006.01) |
| G05B 19/00 | (2006.01) |
| G06F 7/00 | (2006.01) |
| G07D 7/00 | (2006.01) |
| H04B 1/00 | (2006.01) |

(52) U.S. Cl. .................. 340/10.1; 340/5.86; 340/10.51

(58) Field of Classification Search ............... 340/10.1, 340/5.86, 10.51, 10.52, 572, 572.1; 713/159–172; 235/487, 492–494, 375; 709/245, 204–206
See application file for complete search history.

(56) References Cited

U.S. PATENT DOCUMENTS

| | | | | | |
|---|---|---|---|---|---|
| 5,380,991 | A | * | 1/1995 | Valencia et al. | ............ 235/383 |
| 5,396,218 | A | * | 3/1995 | Olah | ...................... 340/568.7 |
| 5,517,188 | A | * | 5/1996 | Carroll et al. | ........... 340/10.52 |
| 5,528,222 | A | | 6/1996 | Moskowitz et al. | |
| 5,757,918 | A | * | 5/1998 | Hopkins | ...................... 705/67 |
| 6,008,727 | A | * | 12/1999 | Want et al. | ............... 340/572.1 |
| 6,100,804 | A | * | 8/2000 | Brady et al. | ............. 340/572.7 |
| 6,111,506 | A | * | 8/2000 | Yap et al. | ................. 340/572.1 |
| 6,297,727 | B1 | | 10/2001 | Nelson, Jr. | |
| 6,381,418 | B1 | | 4/2002 | Spurr et al. | |
| 6,463,416 | B1 | | 10/2002 | Messina | |
| 6,535,129 | B1 | | 3/2003 | Petrick | |
| 6,547,151 | B1 | * | 4/2003 | Baldi | ......................... 235/492 |
| 6,785,739 | B1 | | 8/2004 | Tutt et al. | |
| 6,847,299 | B2 | | 1/2005 | Franks | |
| 6,892,301 | B1 | | 5/2005 | Hansmann et al. | |
| 6,982,640 | B2 | * | 1/2006 | Lindsay et al. | ............. 340/540 |
| 2001/0048756 | A1 | | 12/2001 | Staub et al. | |
| 2002/0005774 | A1 | | 1/2002 | Rudolph et al. | |
| 2003/0046287 | A1 | | 3/2003 | Joe | |
| 2003/0050811 | A1 | | 3/2003 | Freeman et al. | |
| 2003/0137145 | A1 | * | 7/2003 | Fell et al. | ...................... 283/72 |
| 2004/0148192 | A1 | | 7/2004 | Morley et al. | |
| 2004/0205534 | A1 | | 10/2004 | Koelle | |

\* cited by examiner

*Primary Examiner*—Wendy R. Garber
*Assistant Examiner*—Nam Nguyen
(74) *Attorney, Agent, or Firm*—Patrick Reilly

(57) ABSTRACT

A method and apparatus for authenticating currency and other important documents. A preferred embodiment may contain both a substrate, such as paper, and an embedded RFID transponder. An embedded RFID transponder or electronic watermark may contain multiple hierarchical layers of electronic passwords that are used to electronically protect the host currency from counterfeiting, or unauthorized modification. In addition, such intelligent RFID tags may uniquely identify a particular document and data related to the document. The authenticating agency can utilize a public or private Electronic Product Code database as a means for the authenticating agency and third parties to authenticate documents and data in documents. The intelligent interactive Electronic Product Code can be used as an anti-counterfeit mechanism enabling third parties requested to provide services, benefits or monetary payments to authenticate documents and prevent counterfeits.

34 Claims, 12 Drawing Sheets

HIERARCHICAL ELECTRONIC WATERMARKS AND METHOD OF USE

RELATED PATENT APPLICATIONS

This application claims benefit of the priority date of the U.S. Provisional Patent Application Ser. No. 60/428,529, filed on Nov. 23, 2002, and entitled "RFID tags for legal certification of document identify and associated information," inventors Kathleen Lane and William Lane. This application additionally claims benefit of the priority date of the U.S. patent application Ser. No. 10/456,454, filed on Jun. 7, 2003, and entitled "Birth and other legal documents having an RFID device and method of use for certification and authentication," inventors Kathleen Lane and William Lane

FIELD OF THE INVENTION

The present invention relates to devices, systems and methods used to associate and authenticate data with a document such as a financial instrument by means of a radio frequency identification device ("RFID").

BACKGROUND OF THE INVENTION

Automatic identification ("Auto-ID") technology is used to help machines identify objects and capture data automatically. One of the earliest Auto-ID technologies was the bar code, which uses an alternating series of thin and wide bands that can be digitally interpreted by an optical scanner. This technology gained widespread adoption and near-universal acceptance with the designation of the Universal Product Code ("UPC")—a standard governed by an industry-wide consortium called the Uniform Code Council. Formally adopted in 1973, the UPC is one of the most ubiquitous symbols present on virtually all manufactured goods today and has allowed for enormous efficiency in the tracking of goods through the manufacturing, supply, and distribution of various goods.

However, the bar code still requires manual interrogation by a human operator to scan each tagged object individually with a scanner. This is a line-of-sight process that has inherent limitations in speed and reliability. In addition, the UPC bar codes only allow for manufacturer and product type information to be encoded into the barcode, not the unique item's serial number. The bar code on one milk carton is the same as every other, making it impossible to count objects or individually check expiration dates.

Currently cartons are marked with barcode labels. These printed labels have over 40 "standard" layouts, can be mis-printed, smeared, mis-positioned and mis-labeled. In transit, these outer labels are often damaged or lost. Upon receipt, the pallets typically have to be broken-down and each case scanned into an enterprise system. Error rates at each point in the supply chain have been 4–18% thus creating a billion dollar inventory visibility problem. Only with RFID does the physical layer of actual goods automatically tie into software applications, to provide accurate tracking. Also, none of the information of these barcodes is protected or "hidden" from unauthorized readers, making counterfeiting and fraud easy and raising concerns about the loss of privacy.

The emerging RFID technology employs a radio frequency ("RF") wireless link and ultra-small embedded computer chips, to overcome these barcode limitations. RFID technology allows physical objects to be identified and tracked via these wireless RFID tags, or "tags". An RFID tag may function like a bar code that communicates to a reader automatically without needing manual line-of-sight scanning or singulation of the objects. Applied RFID technology promises to radically transform the retail, pharmaceutical, military, and transportation industries, as well as many product or document distribution methods.

An RFID system begins with a reader sending out electromagnetic signals to find a tag. When the radio wave hits the tag and the tag recognizes the reader's signal, the reader decodes the data programmed into the tag. The information is then passed to a server for processing. By tagging a variety of items, information about the nature and location of goods can be known instantly and automatically.

An RFID system may consist of two primary components, an RFID tag ("tag") and a "tag reader". The tag typically includes an IC chip and an antenna. The IC chip may include a digital decoder needed to execute the computer commands that the tag receives from the tag reader. The IC chip also includes a power supply circuit to extract and regulate power from the RF reader; a detector to decode signals from the reader; a transmitter to send data back to the reader; anti-collision protocol circuits; and at least enough EEPROM memory to store its EPC code.

Certain prior art RFID systems use reflected or "back-scattered" radio frequency (RF) waves to transmit information from the tag to the reader. Since passive (Class-1 and Class-2) tags get all of their power from the reader signal, the tags are only powered when in the beam of the reader.

Semi-passive and active tags have a battery to provide power to the chip. This greatly increases read range, and the reliability of tag reads, because the tag doesn't need power from the reader. Class-3 tags only need a 10 mV signal from the reader in comparison to the 500 mV that a Class-1 tag needs to operate. This 2,500:1 reduction in power requirement permits Class-3 tags to operate out to a distance of 100 meters or more compared with a Class-1 range of only about 3 meters.

In 2003, the worldwide total RFID market size was $1.5 B in 2002 and has been growing rapidly. The total RFID market will grow to $7.25 B by the year 2008.

National government agencies, authorized financial institutions or their authorized agents are often responsible for creating, publishing, and authenticating financial instruments. A financial instruments is defined herein to include an electronic document or a hard copy document that is, represents, or is materially related to a financial record, money, a monetary value, an exchange value, currency, a payroll check, a personal check, a cashiers check, a certified check, a negotiable bond, a registered security, a credit card, a debit card, a credit note, a debit note, a promissory note, a title document and/or other suitable documents known in the art that contain or relate to a financial document, an ownership right or a title. The term financial instrument as further defined herein includes coupons, tickets, airline tickets, train tickets, bus tickets, rebates, rebate coupons, credits, credit notes, debits, debit notes, or other documents having financial relevance and issued by public or private persons, organizations, entities, associations, institutions, trusts or corporations. The term document is defined herein to include a financial instrument.

RFID circuit tags, also referred to herein as RFID circuits and RFID tags are presently manufactured and used to track a plethora of items and materials, from items of apparel to volumes of coal as stored by grade and quality. Alien Technology, mentioned as one exemplary manufacturer, provides a 915 MHz RFID tag with 64 bits of field programmable memory and 16 bits of CRC. Yet the prior art fails to suggest or anticipate the use of RFID tags with Electronic Product Codes for federal, state or local government to certify a financial instrument, a legal documents or another suitable document known in the art with a unique digital intelligent codes or the ability for third parties to use an intelligent Electronic Product Code to assure that a document is not counterfeit. More information about RPC codes may be found in published MIT reports and posted on websites like "EPCglobal" and "RFID Journal".

It is an object of the present invention to provide new processes to protect against counterfeiting of financial instruments.

SUMMARY OF THE PRESENT INVENTION

Towards this and other objects made obvious in light of the present disclosure, a method and system are provided to enable the use of a secure financial instrument. In certain preferred embodiments of the method of the present invention the secure financial instrument may comprise an "electronic watermark", wherein an RFID tag having a small integrated circuit is coupled with, embedded within or laminated to a substrate of the instrument using techniques known to those skilled in the art.

Certain alternate preferred embodiments of the method of the present invention provide a system for providing a secure document, where the system includes a computer network having a computer and an RFID transponder. The computer has a database, and the database containing a first authorization key, and the secure document includes an integrated RFID circuit coupled with a flexible substrate. The flexible substrate having a surface, the surface visibly presenting an information. The integrated RFID circuit is coupled with the substrate, and the integrated RFID circuit having a durable memory, a controller, and a data security circuit. The durable memory includes an information storage sector and a protected sector, the information storage sector having a record of at least a portion of the information, and the protected sector having at least one datum not recorded within the information of the flexible substrate. The controller is coupled with the durable memory and the data security circuit, and the controller enables access to the durable memory by the RFID transponder as authorized by the data security circuit. The data security circuit is provided for denying authority to the controller to execute instructions received in a message, where the message is not formatted at least partially in mathematical relationship to the first authorization key.

Certain alternate preferred embodiments of the method of the present invention utilize the development of an Electronic Product Code schema to uniquely identify the entity creating the document, the unique instance of each document, the data related to each unique instance of a document, and a process uniting other parties involved in a document workflow when such third party automated processes employ an Electronic Product Code ("EPC") stored in the tag to read, write and store data stored in the tag or be available on or via a communications or computer network. The optional net effect of the invention is to prevent counterfeit documents being used to request and receive benefits, services or monetary payments from third parties who can now validate the documents and the related data are authentic. An additional optional object of the method of the present invention is to discourage or inhibit unauthorized access to or modification of data stored or recorded within the RFID tag.

In first preferred embodiments of the present invention, the RFID tag may contain a transponder, and the transponder may have recorded or enabled the recording of one, some, or all of at least the following types of electronic information that can be remotely accessed by an RFID reader. These data together may be or comprise the EPC. These types of electronic information include:

a unique serial number embedded within a EPC, an EDC, or other information;

public descriptive information about this currency or document;

a first level of hidden information which may be used to determine the authenticity of the secure document and/or financial instrument;

a first password code or "authorization key" and encryption circuit to protect this first level of hidden information;

a second level of hidden information that can also be used to determine the authenticity of the secure document and/or financial instrument; and a second password code or "authorization key", different from the first, to protect the second level of hidden information.

One, two, or more of the password codes, serial numbers, authorization codes, or other suitable data or information stored within and/or outside of the RFID tag may used to protect against counterfeiting or unauthorized modification of or access to information stored or contained in the RFID tag. Additionally, while a unique code, serial number, authorization code, or other suitable information may be used to help discourage, inhibit or detect counterfeiting, an alternate use may be to enable tracking and counting money. The EPC may be or comprise an Electronic Product Code as issued by EPCglobal that provides access to information stored on the Internet.

To save time and improve accuracy, the EPC information stored in durable memory may be designed to be automatically written into and read out of the tag via the reader.

The hidden information may optionally be useful to detect counterfeit currency and other counterfeits of other important documents. The lower levels of password-coded information may be used to protect merchants, vending machines, bank tellers, and others from counterfeit currency. However the widespread use of such first level passwords, may make a first level password more vulnerable to compromise and fraud. Therefore the first level of electronic password security may be backed up with multiple higher levels of authentication security, each level of security optionally comprising an independent security code or plurality of codes. In certain preferred embodiments of the present invention, millions of merchants may have access to the first level password codes, while only a few hundred thousand bankers will have the second level security password codes. The second level security codes may thus more securely be used to test the currency with both first and second level codes. And an even smaller number of entities, such as regional banks, may back up the local banks with a third level of authentication. Finally, a government agency or authorized agent of a government agency may have a sixth level of code that is shares with no one—and which no one even might know exists—that that the agency or agent uses surreptitiously to look for counterfeiting based upon illegal transmission of knowledge from the highest level of security.

Certain secure documents or financial instruments, such as paper currency, a personal check, deed, lien, contract, and other registered secure documents are widely used and efficient instruments for representing monetary value, ownership, and other agreements among people. Authority for issuing and management of such documents may also be transferred from one agency to another. For example the Federal Government or other authorized public or private agent may delegate to a printer the authority to print currency simply by transmitting certain secret information and other authorization codes to that printer.

According to certain yet alternate preferred embodiments of the method of the present invention, an RFID tag can optionally be used to may be used to uniquely identify and authenticate a specific financial instrument or other suitable document known in the art. In certain preferred embodiments of the method of the present invention, an EPC can be factory embedded during a fabrication process, such as a paper printing process, and/or created at print time by an authorized legal entity or an authorized agent, and attached to the printed paper or other suitable substrate known in the art, or by use a combination of factory manufacturing and printing processes. Certain prior art manufacturing techniques for coupling RFID tags with paper and other suitable substrates known in the art are described in detail in technical papers and other public documents published by companies like the Alien Technology Corporation of Morgan Hill, Calif., Matrics Corporation in Columbia, Md., and the Massachusetts Institute of Technology in Cambridge, Mass.

A RFID tag can be included with financial documents, certified documents or other authentic documents and be used to validate a document and/or the data in the document is authentic when a request for services, benefits, or monetary payment authorized by the document is made. The EPC may be embedded in a memory chip or a durable memory contained within a smart tag on individual documents. The chip can be scanned by a radio frequency "reader," which transmits the document's embedded identity code to a network, where "real" information about the document can be kept. That information is then communicated back from the network to provide whatever information is needed about that product to the requestor. The information stored within the RFID tag or accessed on the network may optionally be used to identify what entity printed the document. An RFID tag might include a unique serial number which can identify a particular instance an authenticating agency printed a document and the data related to a particular instance of a printed document. Such related data can provide the same rights and privileges to an authentic document as a raised corporate seal or bar code does and may either supplement or replace such corporate seals. Additionally, a digital EPC might refer to information on the network or information stored and read within the RFID to identify a creator of the document and associate other data as related to the authentic document bearing or coupled with the RFID tag. Third parties can develop business processes utilizing the EPC to validate the document and data on the document is authentic before granting services, benefits, or monetary payments to individuals presenting the documents as authentic. The digital EPC can include a code identifying the issuer of the document, a document type, a data, and a unique serial number. When combined, these parts of the EPC uniquely identify a particular document. The EPC can enable other business processes to manage and access data related to the document which may not be printed on the document or stored in the RFID tag but is available in electronic form referred and linkable in a remote database. RFID may be the basis for a set or plurality of digital EPC's. The RFID tag may be read only, or may utilize other tags with read-write functionality or even more advanced capabilities. Certain implementations of EPC's might not depend on RFID technology, but rather employ suitable alternate methods known in the art of reading an identifying data from a document or a financial instrument.

Certain other alternate preferred embodiments of the method of the present invention more particularly relate to the use of RFID tags by a trusted authenticating agent to create and embed a unique digital EPC on documents which can be used by third parties as a means to authenticate the document and data related to the document. In particular, the present invention covers the use of RFID tags by authenticating agents to uniquely identify each instance of a document creation and enable third parties to reference such EPC to validate such document and related document data as authentic, whether such data is printed on the document or available on a network.

The integration of radio frequency identification ("RFID") circuit tags as an intelligent digital EPC enabling the tracking and authentication of hard copy documents and data related to the documents is a convergence of technologies that is often useful for authenticating agents in managing document identification and deterring counterfeit or other unauthorized copies of certified or other legal documents.

Certain additional alternate preferred embodiments of the method of the present invention utilize intelligent RFID technology with a unique EPC whereby the EPC can be added to each printing of certified or other legal documents to uniquely identify the document and prevent other parties from counterfeiting such currency or financial documents. The RFID tag enables existing passive printed documents to become smart and interactive, enabling automated processes to validate a document and data related to the document is real, not counterfeit nor revoked, when a document is presented to request and receive services, benefits or monetary payments. The invention also enables new automated business processes which can "read" hidden invisible digital data embedded in an RFID tag attached to a suitable substrate known in the art, such as a paper document or paper currency. The present invention may optionally stores a unique EPC within the RFID and associates the RFID tag with a specific document and a specific transaction enabling third parties to easily identify the authenticating agency that created the document and authenticate the document and the data on the document. The invention optionally uses the EPC code as a means for third parties to be assured a document being presented is an authentic document. The invention also uses the EPC code as a database pointer enabling automated business processes to access data related to the document stored in a network database.

The RFID tag may also include and associate a GPS chip to the document for future tracking and location of legal documents.

In certain yet additional preferred embodiments of the method of the present invention are applied within an information technology system. The information technology system ("IT system") may comprise a communications network or a distributed computer network, such as an Intranet, an extranet or the Internet.

RFID tags may be embedded in printed authentic documents by a paper manufacturer when the paper is printed or may be attached to the document as part of a computer print process. Some combination of factory printing and local computer printer printing may be applied to read and store all elements of the EPC. The certified copy printing process may write and store a serial number on the tag, or the serial number may be attached to the paper during the paper printing process and the IT process reads the serial number stored in the RFID and associates it with the data file/request for an authentic document. In either embodiment, the certified document printing process will provide rules and processes for when and how to read or store EPC information, dependent on whether an RFID tag is embedded in the paper at paper print or will be added when the document is printed on a local printer. The unique EPC is recorded and made available to third parties through an EPC database available on the Internet. The amount and types of data stored in the RFID tag or linked and accessible via remote databases is a fluid definition and may change as new RFID technology allows more data to be stored and accessible in the RFID tag. In other instances, the RFID tag serial number may point to an external EPC Database which can identify the location of a data record users can access or associate other business processes with. The IT system may further or alternatively optionally employ RFID write systems and/or read systems whereby information may be written into RFID tags and read from RFID tags.

In certain preferred embodiments of the method of the present invention, requests are made to the authenticating agency for certified copies of a financial instrument, the authenticating agent utilizes RFID technology to create and attach a unique intelligent EPC in each instance a certified copy of an official record is printed. Said EPC can identify and allow third parties to authenticate documents and information associated with said documents. The EPC may comprise or be an Electronic Product Code as issued by EPCglobal that may be used to access information stored on a network of computers that may include the Internet. The EPC may also point to the location of the database record(s) used by the authenticating agency as a data source for creating the certified document, and access codes determining whether such database records or RFID data fields can be read or written to in transactions requiring validation of identity. The IT processes can include maintaining an audit trail of entities requesting validation of identity in data transactions using such documents to validate/verify the data on the document.

In certain still additional preferred embodiment of the method of the present invention, an authenticating agent collects, stores, associates and authenticates unique identity data with stored records used as a data source for creating and printing certified documents.

If global positioning system ("GPS") data or other IT information (user code attached to a street location) is stored on nearby readers that can communicate with a specific document, the system may use well known IT processes to locate and physically track these documents.

The authenticating agency may also elect to distribute authenticated documents electronically rather than in paper form. The authenticating agency or agent use the RFID tag as a reference to data stored on a network rather than printed on a paper document; RFID processes may require passwords or other identifying data for third parties to access remote data or other digital data stored in the RFID tag. The IT Processes of certain alternate preferred embodiments of the method of the present invention may then read the authenticating codes and keys, which may include a password, validate the code, keys and password within the RFID tag, access hidden identity data stored in the RFID tag or in a remote database according to rights and privileges assigned by the authenticating agency.

Certain alternate preferred embodiments of the method of the present invention provide IT processes to include a legally recognized and accepted digital code or image recognized as the representation of the authenticating agency.

The method of the present invention optionally provides processes to read the RFID tag and request authentication from the authenticating agency that the data and the document are still valid or are suspect or known to be invalid. The authenticated data can be read and automatically populate the requestor database from either data in the RFID tag or data from the authenticating agency database.

Another alternate preferred embodiment of method of the present invention may be used to track documents and transactions involving the verification and validation of information contained in the certified documents and/or to track the location of the documents or entities embedded with data authenticated by the authenticating agency or other authorized agency or agent.

In still other additional alternate preferred embodiment of the method of the present invention, an audit trail can optionally be kept identifying one, a plurality or all places where a financial instrument has been, or has transferred possession, or changed ownership, by means of GPS data collection. An RFID tag or reader with GPS capabilities might optionally be included as part in other embodiments of the method of the present invention. The GPS capability may enable tracking and locating of the document should it become lost or stolen.

Certain still other alternate preferred embodiments of method of the present invention may optionally provide in combination or singularity the following features, aspects or capabilities:

1. Database Pointer. The intelligent RFID tag embedded on the authentic documents may include a unique transaction or other attribute identifier—called a Electronic Document Code "EDC". The unique identifier enables third parties to directly access external databases storing related data. Such database pointer eliminates the need for service validation processes to enter and match data fields from the authenticating agency database. Instead, such unique EPCs can point directly to data fields stored on a network and available in various third party service processes. Although it is possible to enter data printed and visible on a document into a screen before submitting a request to the authentication database via the communications network to authenticate personal data, the ability to read an RFID tag containing a pointer to a specific authentication database and a specific database record used for authentication of the document or the data in the document facilitates the accuracy and speed of the authentication server.

With or without a direct pointer to the identification database, the authentication database or a database system may additionally or alternatively implement complex algorithms, which attempt to match and authenticate identification data.

This EDC database pointer may optionally enable the authenticating agency to notify the requestor if the information in the database record has been changed or revoked.

2. Unique EPC for all documents where third parties desire to ascertain the document is authentic. The unique EPC enables the requestor to validate the documents and related data is authentic.

3. Authenticates document identity in off line transactions. Most credit cards have added an additional data or code to a credit card account. This code is not passed through any automated systems and is not printed on a credit card transaction slip. Therefore if someone is trying, without authorization, to use a credit card in an off line transaction, they cannot do so unless they have your credit card in their physical possession. The RFID tag on an identification document can be used in the same manner, providing the same secondary level of authentication credit card processing requires for off line transactions involving identity documents.

4. Tracking authentic documents. RFID tag technology may optionally enable location tracking of authentic documents. RFID readers will be extensively deployed geographically. Such readers can silently detect the presence of RFID tags on authentic documents and log the location where the RFID tag was read.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
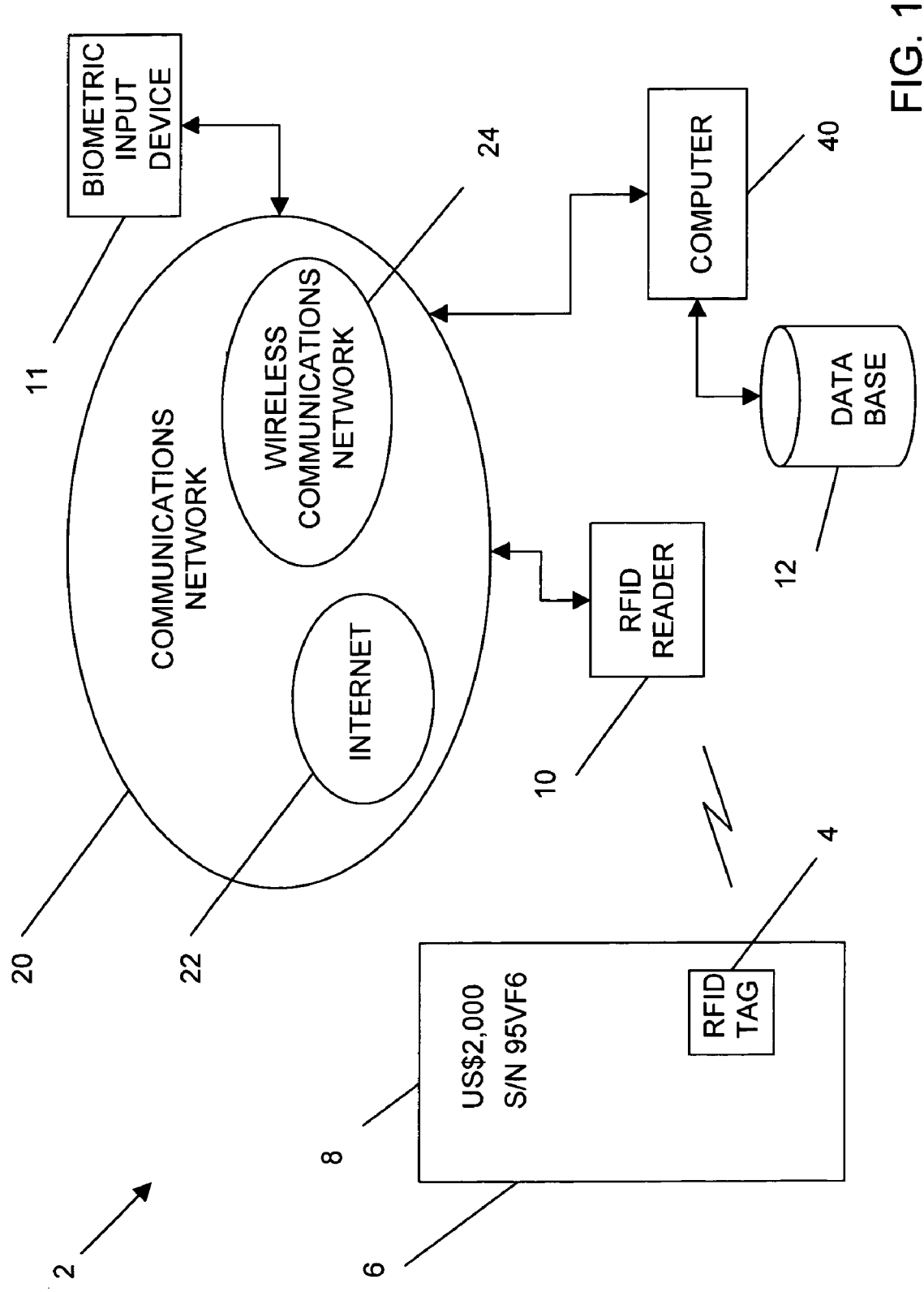
FIG. 1 is an illustration of a document bearing an RFID circuit tag coupled with a substrate with which a preferred embodiment of the method the present invention may be implemented.

Referring now generally to the Figures and particularly to FIG. 1, FIG. 1 is an illustration of preferred embodiment of the present invention 2, comprising an RFID circuit tag 4 attached to a substrate 6. It is understood that in certain alternate preferred embodiments of the present invention the substrate 6 may be one of a variety of suitable print media known in the art, e.g., paper, fabric, plastics, wood products, metal foils, and etc. The document 2, or RFID doc 2, may be or comprise a financial instrument, a document, a legal document, a coupon, a Uniform Commercial Code ("UCC") document, a certified document, a document recorded by a notary public, a document certified as a valid copy by a government agency, a tax document, an ownership document, a payment document, a lien document, a payroll document, a debt document, a credit document, an ownership transfer document, a real estate title document, an asset title document, a motor vehicle title, a check, a personal check, a payroll check, a cashiers check, a certified check, a credit card, a credit note, a promissory note, a debit card, a debit note, a rebate, a rebate coupon, a monetary note, a currency bill, a ticket, an airline ticket, a train ticket, a bus ticket and/or a contract. The substrate 6, or sheet 6, includes a visual pattern 8, where the visible pattern may be a printed image, a typewritten image, a bar code image, an embossed image, an ink image, a handwritten image, a hand drawn image, a computer generated image, a heat imprinted image, an etched image, a painted image and/or a chemically treated image.

An RFID communications device or "reader" 10 is used to read and/or write data from the RFID tag 4. The transmitted data may be information used to (1) validate or authenticate data, (2) validate or authenticate an identity of a conduit, source, or destination of transmitted data, (3) or to authenticate or validate permission or authorization to read from and/or write onto the RFID tag 4.

Figure 2:
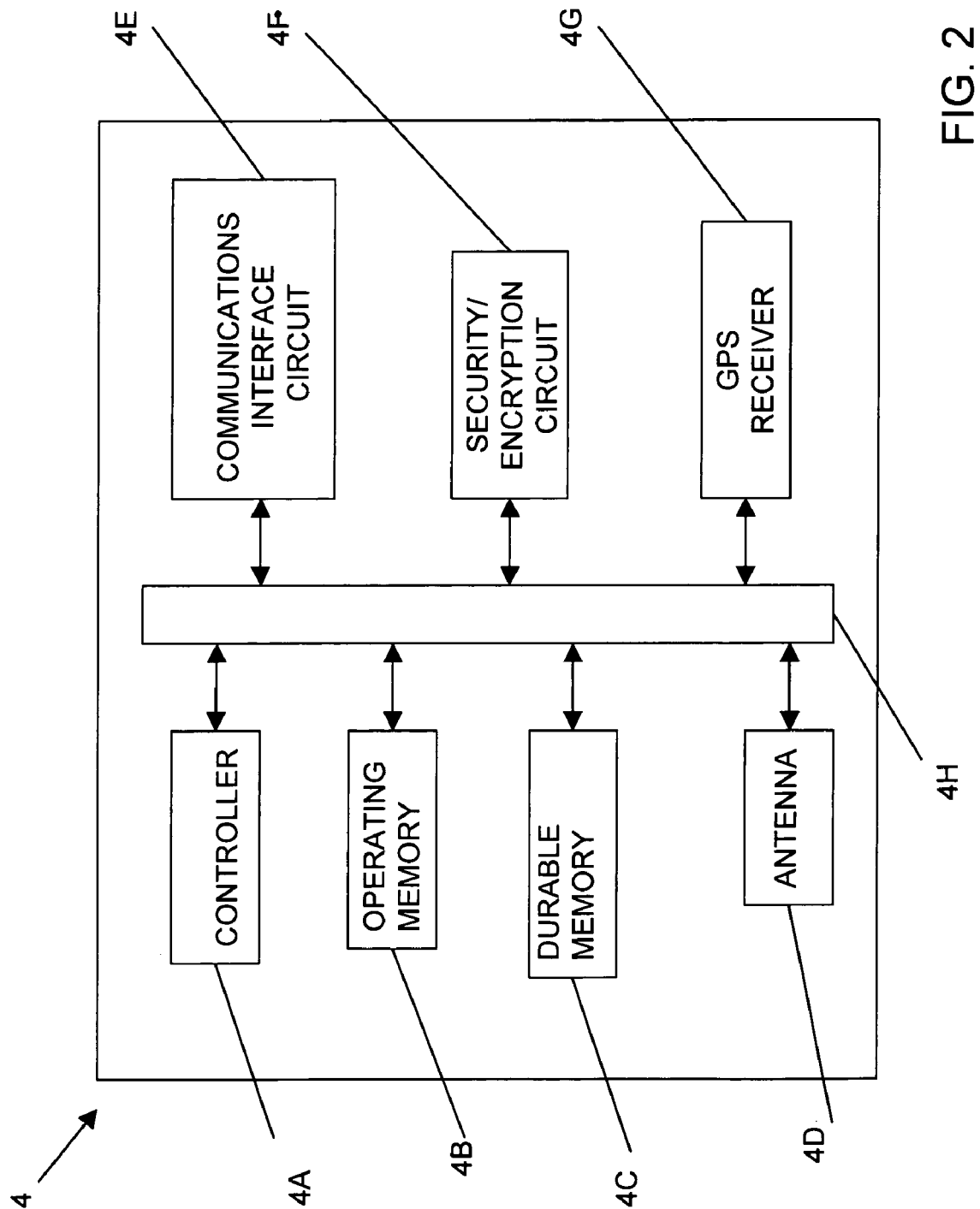
FIG. 2 is a schematic diagram of the RFID circuit tag of FIG. 1.

Referring now generally to the Figures and particularly to FIG. 2, FIG. 2 is a schematic diagram of the RFID circuit tag 4 of FIG. 1. The RFID circuit tag 4, or RFID tag 4, has a controller 4A, an operating memory 4B, a durable data memory 4C, an antenna 4D, a communications circuit 4E and a security/encryption circuit 4F. Data identifying and authenticating the identity of the RFID 2 tag are stored in the durable data memory 4C. In certain alternate preferred embodiments of the present invention the RFID tag 4 may comprise logical circuits and/or programmable logic circuits that direct aspects of the operation of the RFID tag 4 and may partially or wholly execute the operations of the RFID tag 4 without reliance upon a software program stored within or transmitted to the RFID tag 4. In the preferred embodiment 2 of FIG. 1, the RFID tag 4 has a software program at least partially stored within the durable memory 4C, and relied upon to direct the operation of the RFID tag 4. The antenna 4D receives radio signals from the RFID reader 10, or reader 10, and delivers the received signal to the communications circuit 4E. The communications circuit 4E digitizes the received signal and transmits the digitized signal to the controller 4A. The controller 4A may then access the security circuit 4F to authenticate the identity of the reader 10 and to determine if the reader 10 is authorized to request information from, or write information into, or otherwise direct the operation of the RFID tag 2. Information concerning the reader 10, and the instant attempt to access data stored in the RFID tag 2, may be recorded by the RFID tag 4 in the data memory 4C. The antenna 4D may be directed by the controller 4A to transmit radio signals to the reader 10, wherein the radio signal includes data stored in the data memory 4C. The communications circuit 4E acts as enabler for these transmissions from the RFID tag 4 and provides a transmittable signal to the antenna 4D. It is understood that the prior art and conventional techniques of RFID circuit design and operation provides numerous alternate variations of RFID tags that may perform in accordance with the requirements of the method of the present invention, and that the details of the design and operation of the RFID tag 2 are illustrative and not limiting to the scope of the claimed invention.

An optional GPS receiver 4G is coupled with the controller 4A. The GPS receiver 4G may receive signals from the global positioning system ("GPS") and process said signals to generate a location information that indicates the geographic position of the GPS receiver 4G. The GPS receiver 4, preferably located in a nearby reader but possibly attached directly to the tag, then communicates the location information to the controller for storage in the data memory 4C. The location information may be associated with other information stored in the data memory 4C, such as (1) text messages received RFID reader 10, or (2) an identity of a requester of data associated with a request received at approximately the same time by the RFID tag 4 that the GPS signals used to generate location information were received. The controller 4A, the operating memory 4B, the writeable data memory 4C, the antenna 4D, the communications circuit 4E, the security/encryption circuit 4F and the GPS receiver 4G communicate via a communications bus 4H.

Figure 3:
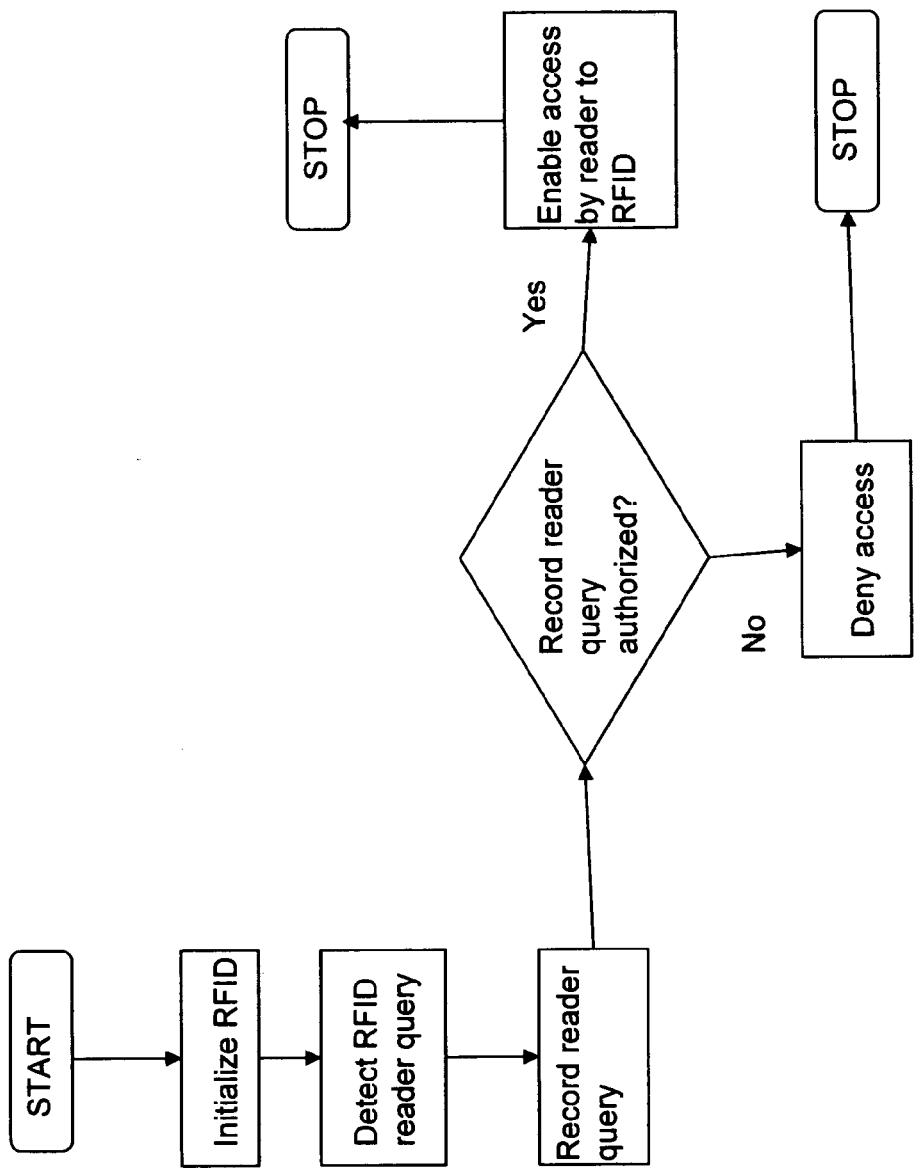
FIG. 3 is a process and software flow chart of a preferred embodiment of the method of the present invention that may be implemented using the RFID circuit tag of FIG. 1

Referring now generally to the Figures and particularly to FIG. 3, FIG. 3 is a process and software flow chart of a preferred embodiment of the method of the present invention that may be implemented using the RFID circuit tag of FIG. 1 and where the RFID circuit tag 4 is coupled with the document of FIG. 1. The RFID tag 4 is initialized by storing initialization data in the data memory 4C and optionally also storing an operating software program in the durable memory 4C. The RFID tag 4 subsequently detects an attempt to access data stored in the data memory 4C by the reader 10. The RFID may optionally create a record of any communications attempt by the reader 10 and store this record in the data memory 4C. Records of communications attempts by various readers 10 that document the identity of requesters of the data may optionally be stored and used as an audit trail to record the identity of agents having attempted to access, or successfully accessed, the data stored in the RFID circuit. The reader 10 may use biometric data and/or a secret code to gain access to the data stored in the RFID tag 4. The RFID tag 4 may in certain preferred embodiments of the method of the present invention access data stored in a remote data base 12 to authenticate the identity of the reader 10, or to authenticate the identity of a person requesting access to the data of the RFID tag 4, and to determine if the reader 10 and/or the requesting person is authorized to receive the data. This procedure may also be followed when the reader 10 is attempting to write data into the RFID tag 2. Where the RFID tag 4 determines that the reader 10 has not provided the necessary information, the RFID tag 4 will deny the information request, record information concerning the failed attempt by the reader 10, and return to a sensing state. In certain still alternate preferred embodiments of the method of the present invention the RFID tag 4 may attempt to transmit a message to the remote database 12 via the reader 10 and a communications network 20. The communications network 20 may be or comprise the Internet. The message may be a revocation or alteration of a validity state of the document 2. The document 2 may be placed in one more validity states by an authority, where the validity states may include (1) a time limit to validity, (2) a maturity state wherein the financial document may be tendered for payment, (3) a revocation by the issuing authority or an another authorized authority, (4) an obligation state, (5) an encumbrance state, or (6) other suitable validity states known in the art and related to one or more characteristics of a financial instrument or document.

Figure 4:
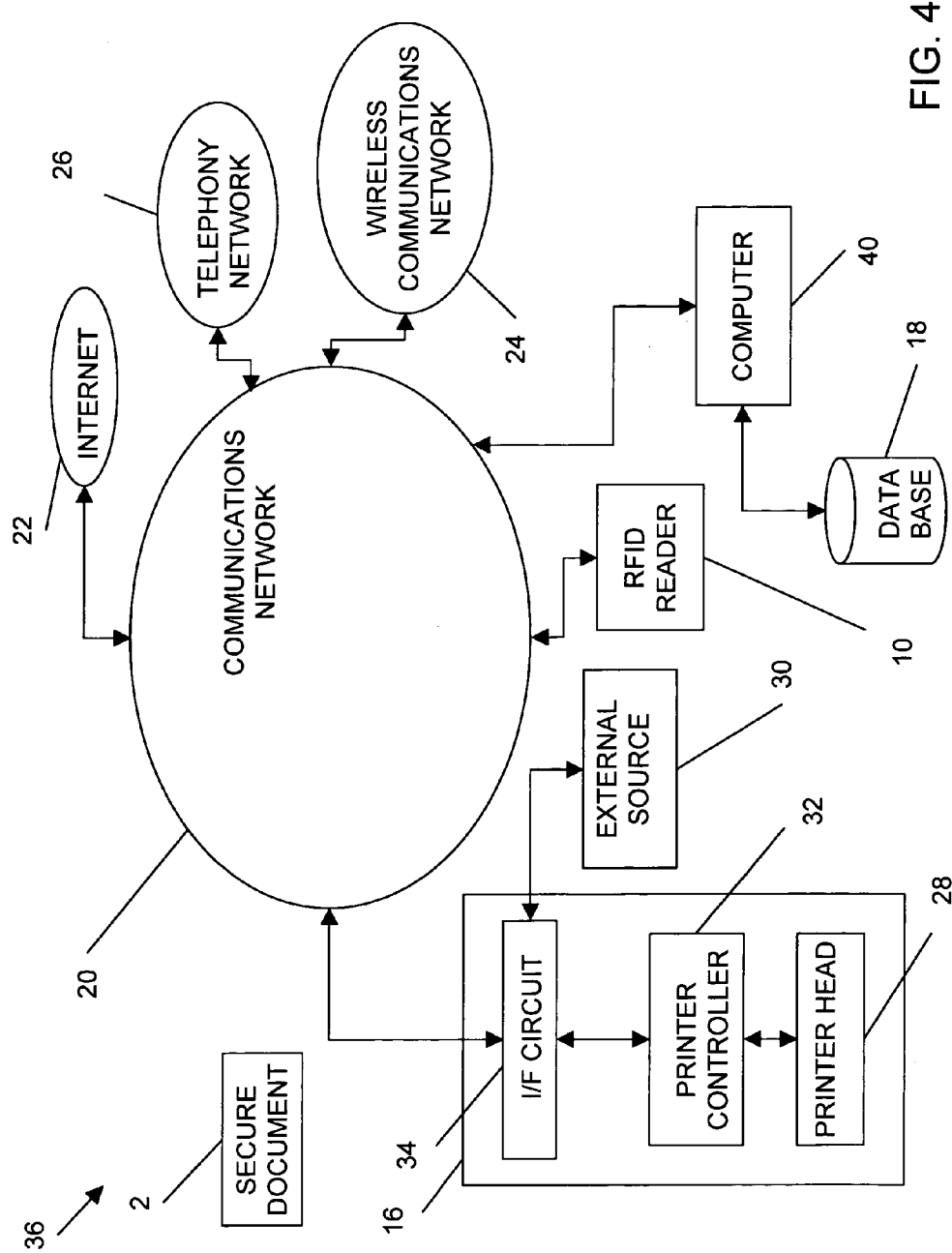
FIG. 4 is a yet alternate preferred embodiment 14 of the present invention comprising a printer, a database communicating with the printer via a communications network and the RFID document of FIG. 1.

Referring now generally to the Figures and particularly to FIG. 4, FIG. 4 is a yet alternate preferred embodiment 14, or print system 14, of the present invention comprising a printer 16, a database 18 communicating with the printer 16 via a communications network 20 and the RFID document 2 of FIG. 1. The communications network 20 may be or comprise via the Internet 22 and/or a wireless electronic communications network 24, and/or an electronic telephonic network 26. The substrate 6 is inserted into the printer 16 whereby the visual pattern 8, as shown in FIG. 1, is formed on the sheet 6 by a printer head 28. The reader 10 accepts data from the remote database 12 via the communications network 20 and/or a local source 30, such as a keyboard, and transmits the data to the RFID tag 4 to initialize the RFID tag 4 or to update the data stored in the RFID tag 4. A printer controller 32 receives data and instructions from the remote database 12 over the Internet 26 and via an interface circuit 34 and directs the printer head 28 and the reader 10 to transmit and print data to the document 2 in accordance with the received data and instructions. Alternatively or additionally, the printer controller 32 may optionally receive data and/or instructions from the local source 30 and direct the printer head 28 and the reader 10 to transmit and print data to the RFID doc 2 in accordance with the received data and instructions. The optional or alternative local source 30 is communicatively linked with the printer controller 32 in order to provide data to the printer 16 for recording upon the substrate 6.

Figure 5:
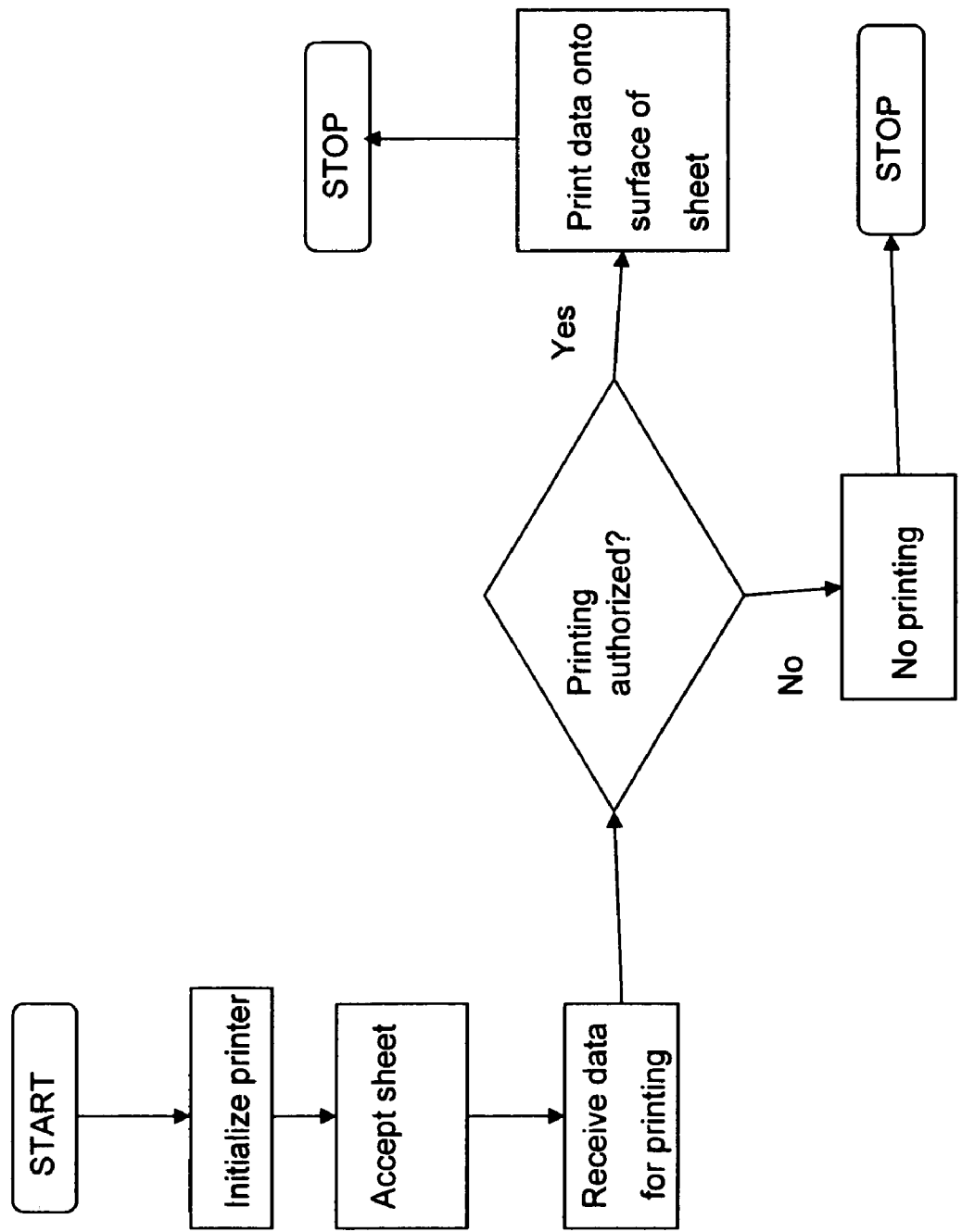
FIG. 5 is a process and software flowchart of an alternate preferred embodiment of the method of the present invention that may be implemented with the printer of FIG. 4.

Referring now generally to the Figures and particularly to FIG. 5, FIG. 5 is a process and software flowchart of an alternate preferred embodiment of the method of the present invention that may be implemented with the printer 16 of FIG. 4, the database 12, the document 2 and RFID circuit tag 4 of FIG. 1. The sheet 6 is placed into the printer 16, and data and/or instructions are received from the communications network 20 and/or the local source 30. The RFID tag 4 is then accessed and written into, and the sheet 6 is printed on by the printer head 28 under the direction of the printer controller 32 and in accordance with the received data and instructions. The sheet 6 may then removed from the printer 16.

Figure 6:
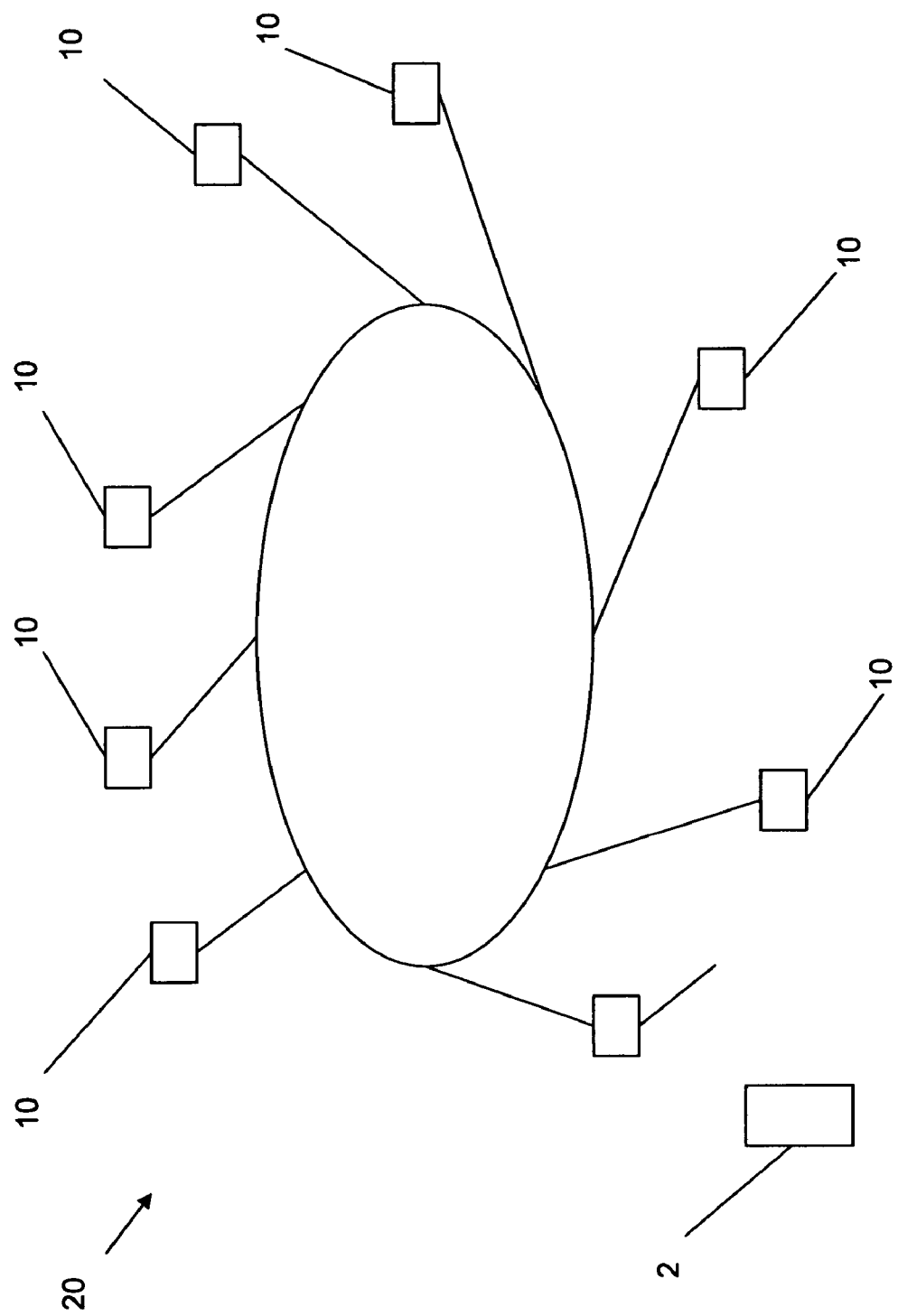
FIG. 6 is an illustration of a plurality of RFID readers of FIG. 1 geographically distributed and in communication over the communications network of FIG. 4.

Referring now generally to the Figures and particularly to FIG. 6, FIG. 6 is an illustration of a plurality of RFID readers 10 of FIG. 1 geographically distributed and in communication over the communications network 20 and tracking, or used to track or record, the physical position of the document of FIG. 1 over time and as the document 2, or RFID doc 2, is moved between different locations. The tracking of the RFID doc 2 made possible by the periodic or asynchronous contacts between the RFID doc 2 and one or more of the readers 10 reduce the potential for loss, misplacement and misuse of the RFID doc 2.

The method of the present invention optionally provides various alternate embodiments that may include, one, two, all or a plurality of the following aspects, capabilities, and/or components:

The use of a digital EPC stored in one or more RFID tags attached to printed documents and used by authenticating entities to uniquely identify a legal document as a document created by the authenticating agency and which third parties can access in automated business processes to ascertain if a document is authentic.

The use of a digital EPC stored in RFID tags 4 and attached to printed documents 2, by authenticating entities or by the authorization of an appropriate entity, to uniquely identify (1) a particular instance of a document created by the authenticating agency and (2) the data referred to in the document 2.

The creation of an EPC database stored and accessible on a computer network, preferably the Internet 22, which maintains the database 12 of documents 2 and the EPC printed on the document 2. A new EPC record record may be created or referred to by the authenticating agency for use in tracking each individual document. The EPC or EDC database may be proprietary to a particular authenticating agency or the authenticating agency may also decide to include the EPC in a public EPC or EDC database stored on a network and accessible by third parties to authenticate or process a document.

The ability for (1) parties who originate and issue authenticated documents and optionally (2) third parties who process such documents, to use an EPC database, an EPC database, and/or a combined EPC and EPC database, as a means of maintaining status about a document.

The use of a digital EPC on one or more printed documents to store data related to the document or transactions related to the document, and/or the ability to use the EDC code as a pointer to a remote database utilizing the EDC code as a common identifier linking transactions related to the document and accessible to third parties.

The structure of a common EDC which authenticating agencies and other parties can use to develop automated processes for locating and editing linked documents.

The use of digital EPCs, EDCs, secret codes, and hidden digital information attached to documents, by public or private agencies, to identify and certify legal documents as authentic, in particular financial instruments, such as monetary notes, bills of currency, rebates, rebate coupons, and/or coupons. Monetary notes may include notes or currency bills having value denominations, such as (1) dollar bills issued by the United States Treasury, or (2) a monetary note, bill of currency, or financial instrument issued by a government, an agency, a corporation, an institution, an association, or an entity.

The use of a combination of digital EPCs, EDCs, secret codes, and hidden information applied and attached various types of documents 2 used in commercial financial transactions by authenticating entities enabling third parties to validate the document 2 and data related to the document 2 is authentic, including checks, corporate shares, bonds, and currency.

The use of a EPC by the authenticating agency and third parties who process such documents 2 to utilize the EPC as a means of attaching other data attributes to the document, such as status codes. For instance, if a third party cashes a document 2 that is a check, the automated processes may include a data attribute to the EPC database indicating that a third party cashed the check 2.

The flexibility of the design of the EPC database, EPC database, and/or combined EPC and EPC database ("combined database") to store data or provide links to data depending upon the attributes of the RFID tag used. For instance, some RFID tags 4 would permit the EPC, EPC, and/or combined database to identify or be used to identify the authenticating entity and a unique serial number of a document or a particular unit of a type of product. Automated business processes may optionally access a record of the EPC, EPC or combined database, wherein the record was created when the document or unit was created in order to enable access to, and the ability to process, data related to the document or unit. In other instances, the design of the RFID tag may enable the authenticating entity and third parties to read, write and store document data within the RFID tag attached to, coupled with, or comprised within the document.

Generating or employing an EPC that may optionally be stored in either write-once read-many memory, or by other suitable devices or methods known in the art that can ensure that a stored EPC cannot be modified.

The use of RFID tags to identify and/or validate the authenticating agency who created the document, i.e. the originating agency, in a manner similar to or the same as (1) a corporate seal printed on a document does today to signify authenticity for the entity creating the document, and/or (2) an MICR coding on a check might imply or certify that a check was printed by a bank.

Associating a unique database record identifying the database record that an originating or authenticating agency, or its agents, used as source data, which can optionally be accessed or validated from a remote database Embedding the EPC code, where the EPC itself identifies, or indicates by reference to a database 12, (1) the identity or an identifier of an originating or authenticating agency of the document 2, (2) the printed transaction as either part of a preprinted form or added as part of a forms printing process hidden as digital data embedded or attached to the document 2, and (3) user profiles enabling third parties to access, read, write or update such hidden data.

A redundant system for both printing information onto the substrate 6, for example paper, and also storing either all or portions of the printing information in the form of digital data in a RFID tag 4 that is integrally embedded within the substrate 6.

Means for determining both the authenticity and accuracy of information printed on paper or other suitable flexible substrate material using data stored on an integrated circuit 4 embedded within the paper.

A composite electronic and paper document 2 wherein the printed paper document 2 displays data stored in an integrated circuit 4 embedded within the document 2.

Means for creating a three-way link between the printed or visually displayed information on a document 2, the electronic information stored in a memory embedded within the document, and/or the authority that generated or owns the document 2.

An integrated device 4 for both printing on paper 6, writing data into, and reading data out RFID tags 4 embedded into such paper 6 or other suitable flexible substrate 6 known in the art.

Figure 7:
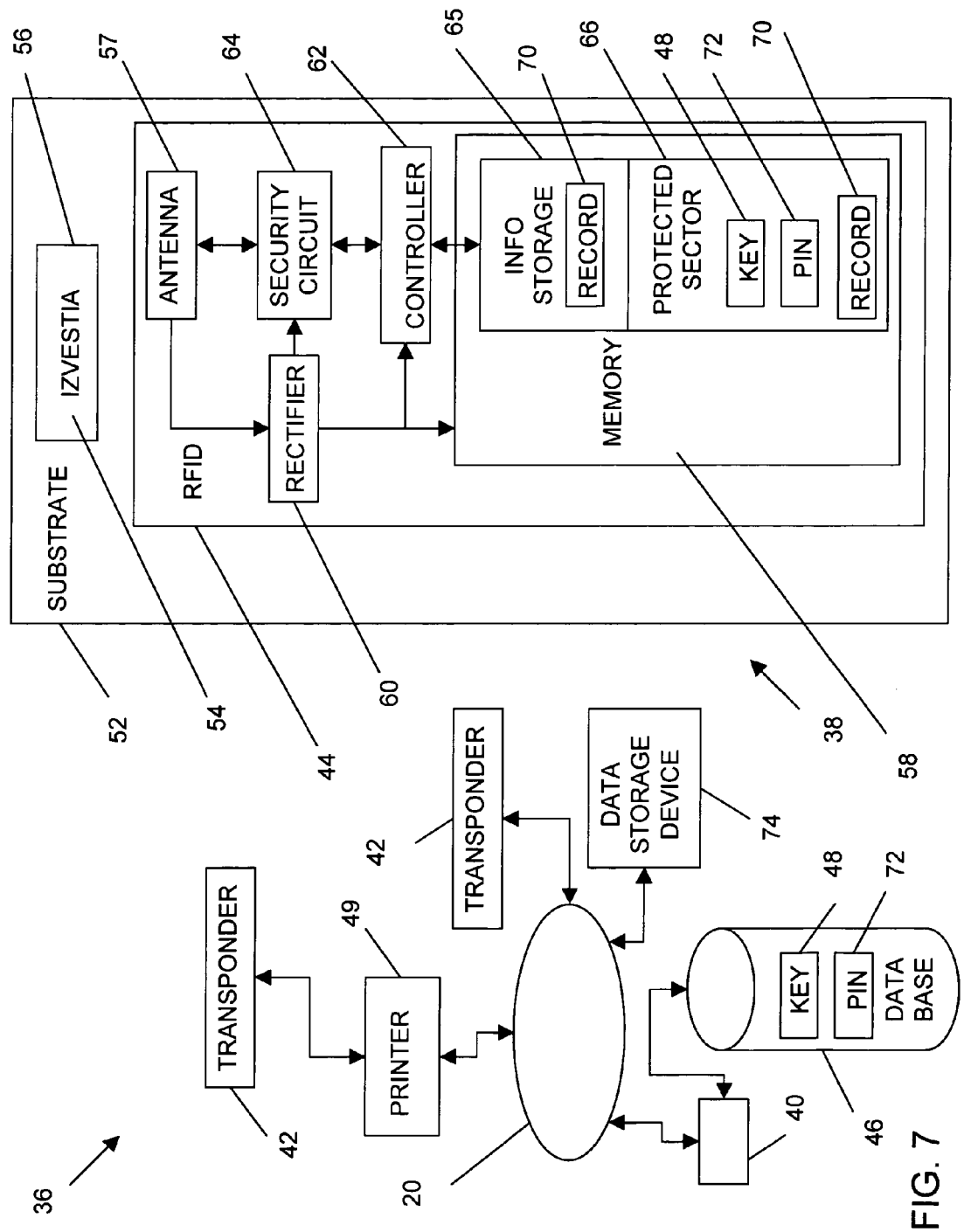
FIG. 7 is a schematic diagram of an alternate preferred embodiment of the present invention.

Referring now generally to the Figures and particularly to FIG. 7, an alternate preferred embodiment of the present invention 36, or document system 36, includes a secure document 38 and the computer communications network 20. A computer 40 communicates via the communications network 20 with an RFID transponder 42. The RFID transponder 42 may send and/or receive information from an integrated RFID circuit 44 of the secure document 38. The computer 40 contains a database 46, and the database 46 stores a first secret code or authorization key 48. The computer 40 may at least partially format, encode or encrypt messages at least partially on the basis of a mathematical process that employs the first authorization key 48. The term computer is defined herein to be or comprise a personal computer, personal digital assistant, workstation, networked computer, computer network or other suitable electronic computer, calculator, computational engine, or device known in the art. The first authorization key 48 may optionally include of biometric data or a checksum that may be computed upon the basis of at least one datum stored within the integrated RFID circuit 44 and at least a portion of the information printed on the secure document.

The document system 36 may further comprise the printer 16, where the printer 16 is communicatively coupled with the computer 40 and the printer 49 for adding visible information to a surface 50 of a flexible substrate 52. According to certain still alternate preferred embodiments of the method of the present invention, the document system 36 may include a means for printing information onto the flexible substrate, and the durable memory may store (1) a EPC, and (2) a print-time key, wherein the print-time key is written into the durable memory at approximately the moment that visible information is added to the flexible substrate. The printer 16 may further include an RFID transmitter, the transmitter for providing the print-time key to the durable memory.

The secure document 38 further includes the flexible substrate 52 coupled with the integrated RFID 44. The flexible substrate 52 comprises the surface 50, wherein the surface 50 visibly presents a sensory perceptible image 54, the perceptible image 54 for visual, tactile or sensory observation by a human being. The image 54 may be perceived by a human being to communicate an information 56, such as a financial value, exchange value, or face monetary value. The integrated RFID circuit 44 has an antenna 57, a durable memory 58, an RF rectifier 60, a controller 62 and a data security circuit 64. The RF rectifier 60 receives energy by radio frequency reception and provides the received energy to the RFID circuit 44 to execute internal and input/output communications and for other electronic operations. The term durable memory is defined herein to include a static or non-volatile memory, or other suitable memory or RFID memory component known in the art. The memory 58 includes an information storage sector 65 and a protected sector 66. The durable memory 58 optionally storing a record 70 in the information storage sector 65 and/or the protected sector 66, and the record 70 having of at least a portion of the information 58. The protected sector 66 may optionally have at least one datum not recorded within the information 56 recorded upon the flexible substrate 52. The RFID controller 62 is coupled with the durable memory 58 and the data security circuit 64, and the controller 62 enables access to the durable memory 58 by the RFID transponder 42 as authorized by the data security circuit 64. The data security circuit 64 denies authority to the controller 62 to execute instructions received in a message, where the message is not formatted, encoded or encrypted at least partially in mathematical relationship to the first authorization key. The durable memory 58 may further optionally include information that relates to one or more codes that specify (1) a nation, (2) a province, county, city or other suitable subunit of nation, (3) serial number, or (4) transaction code.

The document system 36 may further comprise a plurality of secret authorization codes or keys 48, the plurality of authorization keys 48 stored within the durable memory 58 and the plurality of authorization keys 48 stored within at least one data storage device 74 communicatively coupled with the communications network 20. The plurality of authorization keys 48 arranged within a hierarchy, wherein the data security circuit authorizes the controller to execute an instruction received within a message, wherein the message is at least partially formatted in mathematical relationship to at least one of the plurality of authorization keys 48, and the data security circuit limits a scope of execution of the instruction or access to memory in accordance to the level of this particular authorization key within the hierarchy.

The secure document 38 may be an airline ticket, a train ticket, a bus ticket, a coupon or a financial note, such as a personal check, a payroll check, a certified check, a cashier's check, a note of currency issued by a governmental authority. Where the secure document 38 comprises a payroll check or a payroll card, personal check, or other financial instrument wherein the RFID 44 and or the surface 50 of the flexible substrate 52 may record a personal identification number 72 ("PIN"). The PIN 72 may be accessed by the RFID transponder 42 and/or the communications network 20 to reduce the incidence of cashing forged checks or unauthorized cashing of payroll checks. Information specifying or relating to the authorized amount of the payroll check may be provided on the flexible substrate 52 or within the RFID 44. The PIN 72 may be at least partially based upon, or mathematically expressing or derived from, suitable biometric data or voice data known in the art The RFID 44 may be coupled with the flexible substrate 52 prior to any printing or establishment of visual, tactile or otherwise sensory detectable images upon the surface 50 of the flexible substrate 52. The RFID 42 may also be coupled with the flexible substrate 52 at approximately the same time as a visually perceptible image is added or modified on the surface 50.

In still other alternate preferred embodiments of the present invention the secure document 38 may be a title to a real property and the identification data may be stored within the RFID 44 and/or the provided on the surface 50 of the flexible substrate 52. The identification data may be used to associate the secure document 38 with lien and encumbrance information stored within the communications network 20, whereby a user may investigate if a real property identified in, described by or associated with the secure document 38 has a lien or encumbrance recorded within a database linked to the RFID transponder 44 or the communications network 20.

The durable memory 58 may optionally store information related to an airline flight, the price of an airline ticket, or a travel destination. In certain still other alternate preferred embodiments of the method of the present invention, the durable memory 58 may store information related to a manufacturer, a product identifier, and/or a redemption value of a coupon.

Figure 8:
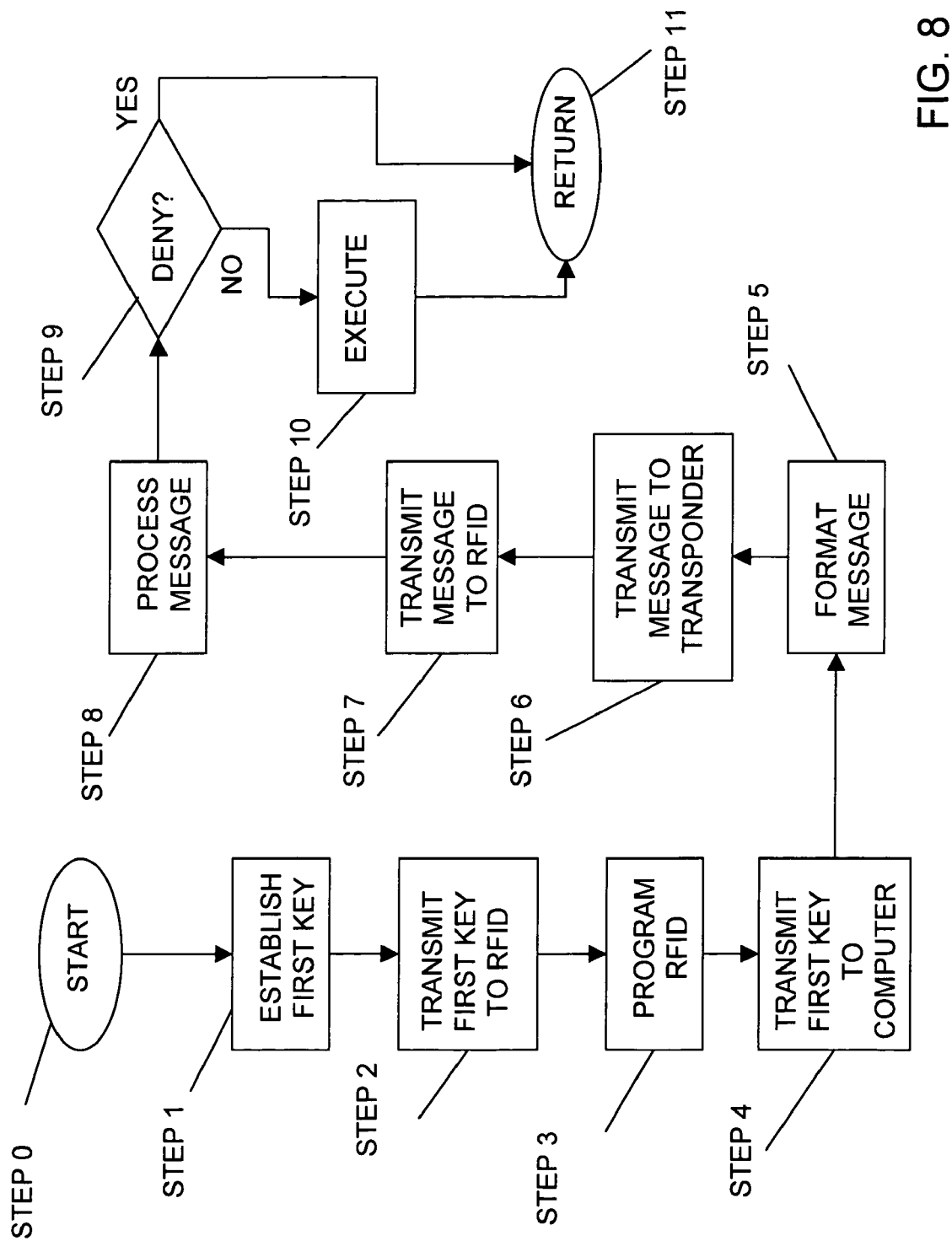
FIG. 8 is a flowchart of a method of the present invention that may be implemented by means of the preferred embodiment of the present invention of FIG. 7.

Referring now generally to the Figures and particularly to FIGS. 7 and 8, FIG. 8 is a flowchart of a method of the present invention that may be implemented by means of the document system 36 of FIG. 7. In STEP 1, the first authorization key is established. The first authorization key is provided to the RFID in STEP 2. In STEP 3 the privacy circuit of the RFID is programmed to identify messages formatted, encrypted and/or encoded at least partially on the basis of the first authorization key. The first authorization key is provided to the computer in STEP 4. In STEP 5 a message is formatted, encrypted and/or encoded at least partially on the basis of the first authorization key. The message is transmitted from the computer to the RFID transponder STEP 6. In STEP 7 the message is transmitted from the RFID transponder to the RFID. The privacy circuit processes the message in STEP 8 to determine if the message is formatted, encrypted and/or encoded at least partially in mathematical relationship to the first authorization key. In STEP 9, where the message is not formatted, encrypted or encoded at least partially in mathematical relationship to the first authorization key, authority is denied to the controller to execute instructions received in a message.

Figure 9:
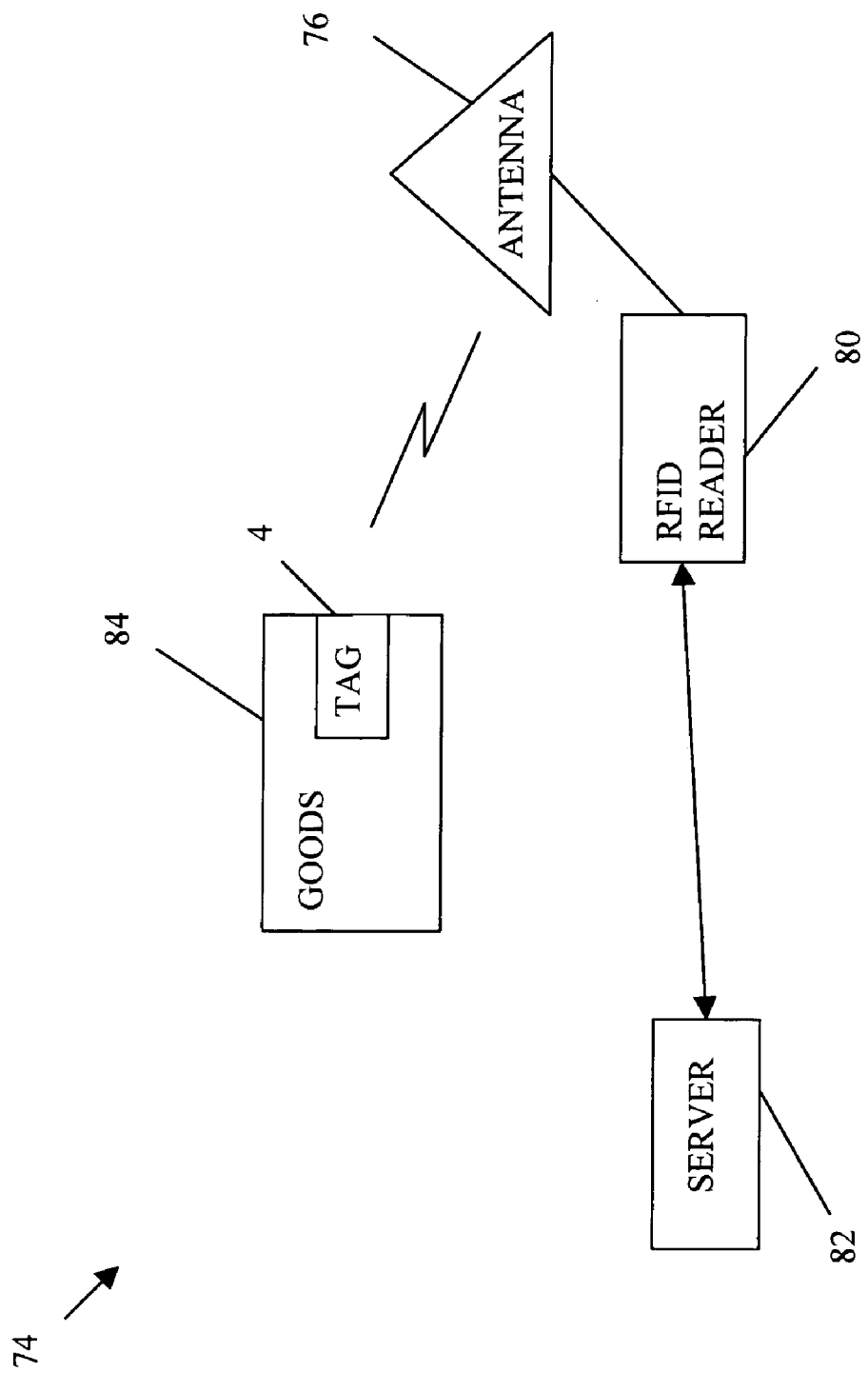
FIG. 9 illustrates an RFID system.
Figure 10:
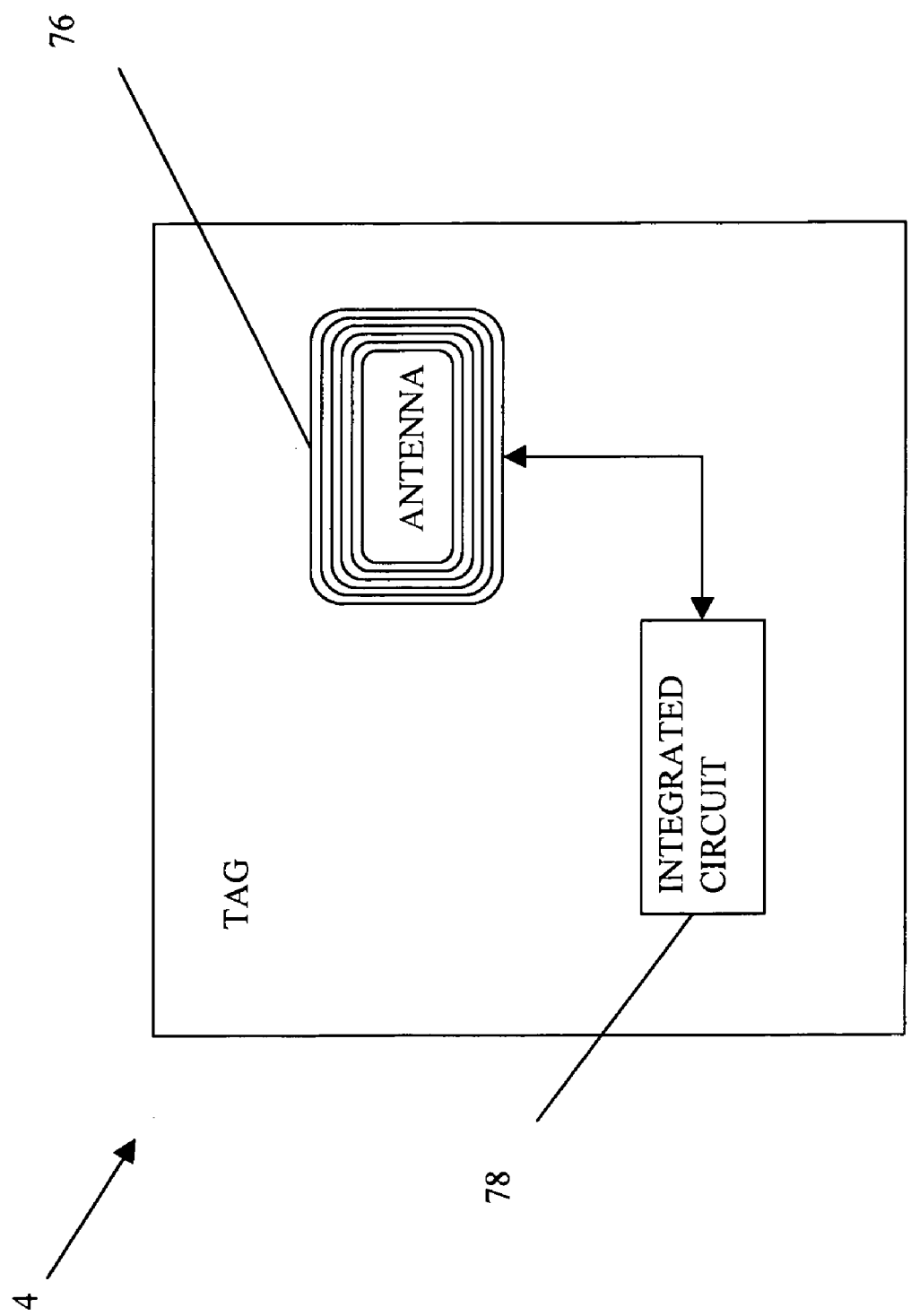
FIG. 10 presents an antenna and an integrated circuit optionally comprised within the RFID tag of FIG. 1 and/or the RFID tag of FIG. 9.

Referring now generally to the Figures and particularly to FIGS. 9 and 10, FIG. 9 illustrates an RFID system 74 and FIG. 10 presents an antenna 76 and an integrated circuit 78 of tag 4. The RFID system 74 operates with a reader 80 sending out electromagnetic signals to communicatively link with the tag 4. When the radio wave hits the tag 4 and the tag 4 recognizes the reader's signal, the reader 80 decodes the data programmed into the tag 4. The information is then passed to a server 82 for processing. The server 78 may be a computer. By tagging a variety of items, information about the nature and location of goods 84 can be known instantly and automatically.

The RFID system 74 includes two primary components, the tag 4 and the tag reader 80. The tag reader 80 and the tag 4 may communicate via radio frequencies, wherein the tag reader 80 is or comprises an RF reader 80. The tag 4 includes the integrated circuit 78 and the antenna 76. The integrated circuit 78 includes a digital decoder needed to execute the computer commands the tag receives from the tag reader 76. The integrated circuit 78 also includes a power supply circuit to extract and regulate power from the RF reader 76; a detector to decode signals from the reader; a transmitter to send data back to the reader; anti-collision protocol circuits; and at least enough EEPROM memory to store an EPC and/or EPC.

The system 74 may, in certain alternate preferred embodiments of the method of the present invention, use reflected or "backscattered" radio frequency (RF) waves to transmit information from the tag 4 to the reader 76. Since passive (Class-1 and Class-2) tags get all of their power from the reader signal, the tags 4 are powered only when the tag 4 is in the beam of the reader 76.

Semi-passive and active tags 4 have a battery to provide power to the integrated circuit 78. This greatly increases read range, and the reliability of tag reads, because the tag 4 doesn't need power from the reader. Class-3 tags only need a 10 mV signal from the reader in comparison to the 500 mV that a Class-1 tag needs to operate. This 2,500:1 reduction in power requirement permits Class-3 tags to operate out to a distance of 100 meters or more compared with a Class-1 range of only about 3 meters.

Figure 11:
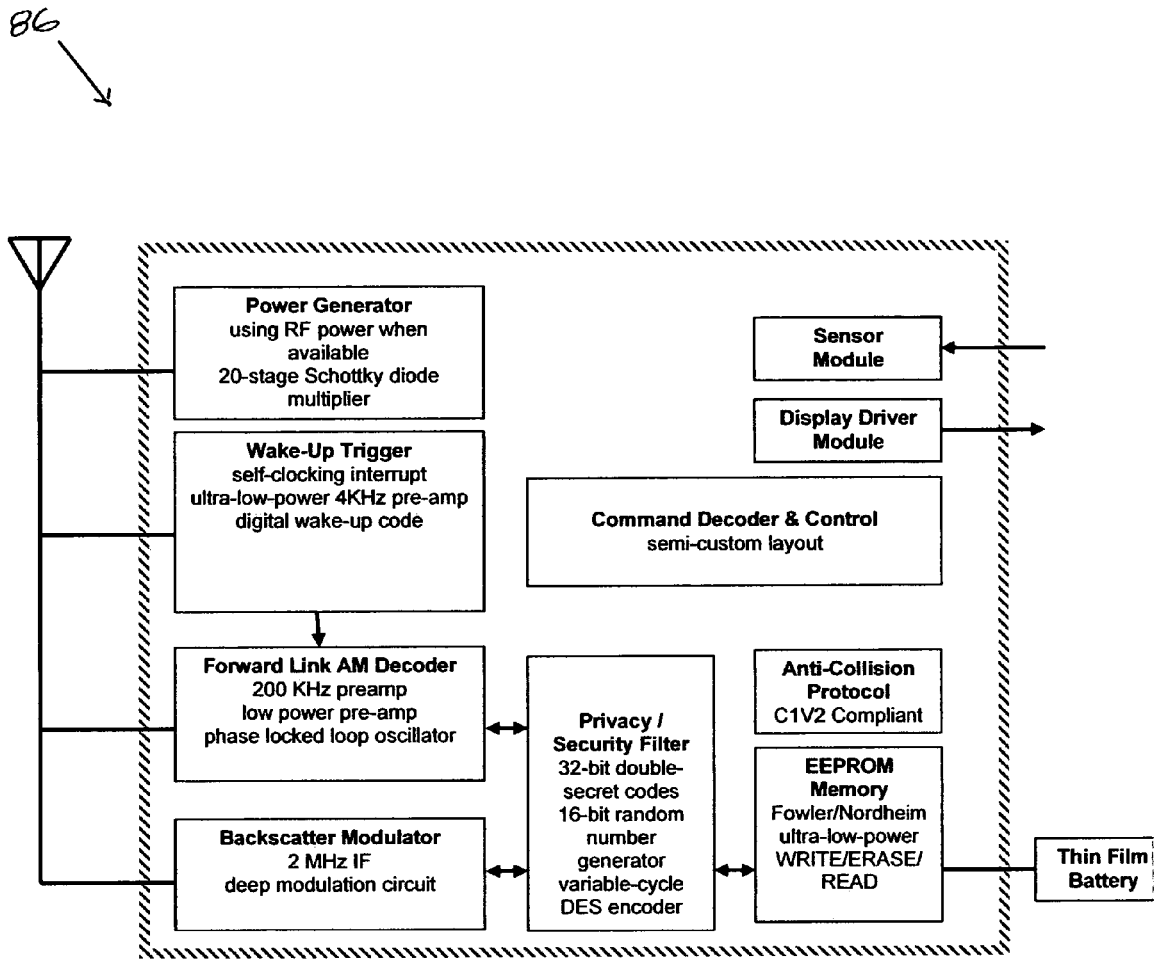
FIG. 11 provides a block diagram with details of the IC chip portion of the preferred embodiment of the RFID tag of FIG. 1.
Figure 12:
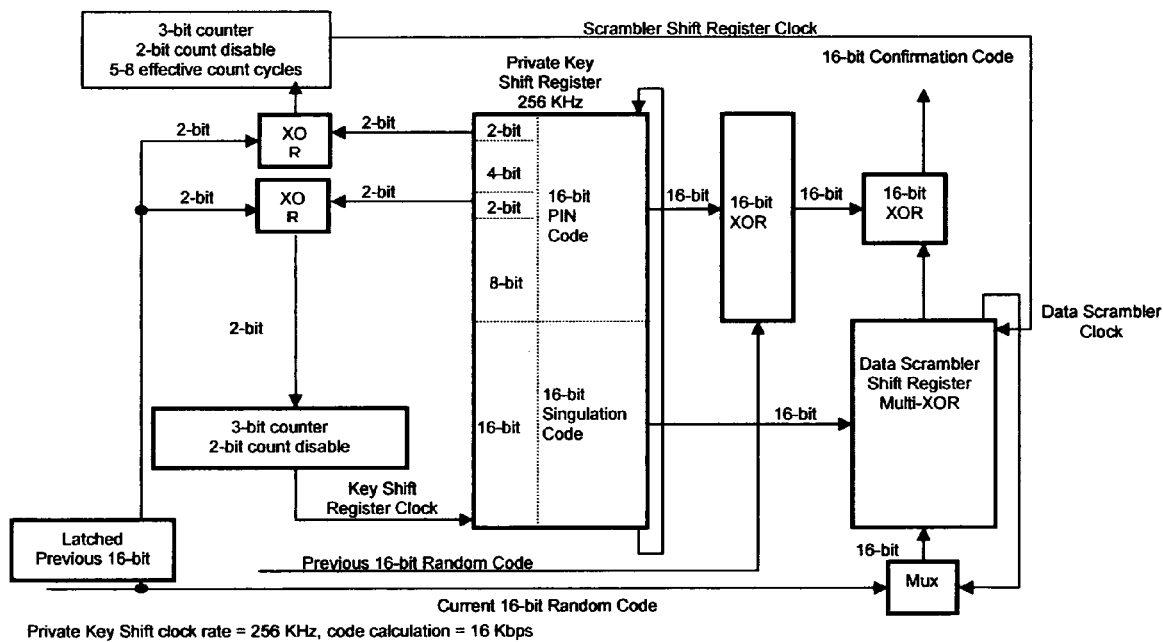
FIG. 12 is a schematic diagram of a data encryption circuit optionally comprised within the RFID tag IC chip of FIG. 11.

Referring now generally to the Figures and particularly to FIG. 11 and FIG. 12, FIG. 11 illustrates an alternate preferred embodiment 86 of tag 4, or RFID 86. FIG. 12 is a schematic diagram of a data encryption circuit 4F of tag 4 or RFID 86. FIG. 11 provides a block diagram for the secure RFID 86. Although important, the power generation and regulation circuits, the digital command decoders and control, sensor interface module, the new C1V2 interface protocol, and the power source, (all shown in green fill) are all based on industry-proven technology and are known to those skilled in the art.

Note that the RFID 86 includes a Class-2 or higher tag that includes highly-simplified, effective, security encryption circuit 4F like the one shown in FIG. 12, or other suitable encryption circuit known in the art. Class-2 and higher circuits show how existing symmetric double-secret-code encryption systems can be improved and simplified at the same time. To prevent eavesdropping, the 32-bit secret codes are never directly transmitted over the air link in either direction between the RFID 86 and the reader 76. Instead, the RFID 86 begins the exchange by spontaneously generating a 16-bit random number that is then sent to the reader 76. The reader 76 responds with a 16-bit random code of its own that it then sends to the RFID 86. Both the reader 76 and the RFID 86 then mix parts of this random code with other parts of their respective 32-bit secret codes using a "hash circuit". To deter attack against even a very powerful code-breaking attack, the hash function is repeated as many as 8-times, and both the number of hash-scrambling cycles, and the amount of register offset between each cycle, vary randomly under control of scrambled counter codes that are hidden from an outside observer. The counter codes themselves are a hidden function of both the random number and the secret codes. Finally, all data, commands, and addresses flowing across the air link between the tag and the reader are scrambled against the output of this hash generator. This includes the "personal information" data referred to in this invention. Unless all the bits are correctly decoded, both the tag and reader are designed to ignore the command and ignore the data.

Note also, that once the 32-bit secret code is initially either written into, or alternatively read out from, the RFID 86; these secret codes are never transmitted either into or out of the RFID 86 again. This prevents anyone from monitored these codes, copying them, and breaking the security. Instead, the double 32-bit secret codes are used to scramble and de-scramble the data but are themselves never transmitted in or out of the tag. The highly-asymmetric nature of the scrambling or "hash" circuit makes it impossible to deduce the secret code from the outputs that are sent back and forth to the tag.

Each RFID 86 may have a different randomly assigned secret code, so gaining access to one secret code provides no help in gaining access to other secret codes. Finally, it is obvious to those skilled in the art that the length of the secret code and the complexity of the scrambler circuit may be increased if necessary to increase the data security even further.

In certain still alternate preferred embodiments of the present invention the RFID tag 86 may contain a transponder, and the transponder may have recorded or enabled the recording of one, some, or all of at least the following types of electronic information that can be remotely accessed by an RFID reader 76:

a unique serial number;
    public descriptive information about this currency or document;
    a first level of hidden information used to determine the authenticity of this document;
    a first secret code or "authorization key" and encryption circuit to protect this first level of hidden information;
    a second level of hidden information that can also be used to determine the authenticity of the financial instrument; and
    a second secret code or "authorization key", different from the first, to protect the second level of hidden information.

One, two, or more of the secret codes, serial numbers, EPCs, EDCs, or other suitable data or information stored within and/or outside of the RFID tag 4, 86 may used to protect against counterfeiting or unauthorized modification of or access to information stored or contained in the RFID tag 4, 86 may be an EPC or EDC. Additionally, while a unique code, serial number, authorization code, or other suitable information may be used to help discourage, inhibit or detect counterfeiting, an alternate use may be to enable tracking and counting money.

The hidden hierarchical information may optionally be useful to detect counterfeit currency and other counterfeits of other important documents and may be designed to operate at one, two or more hierarchical levels. The lower levels of password-coded information may be used to protect merchants, vending machines, bank tellers, and others from counterfeit currency. However the widespread use of such first level passwords may make a first level password more vulnerable to compromise and fraud. Therefore the first level of electronic password security may be backed up with multiple higher levels of authentication security, each level of security optionally comprising an independent security code or plurality of codes. In certain preferred embodiments of the present invention, millions of merchants may have access to the first level password codes, while only a few hundred thousand bankers will have the second level security password codes. The second level security codes may thus more securely be used to test the currency with both first and second level codes. And an even smaller number of entities, such as regional banks, may back up the local banks with a third level of authentication. Finally, a government agency or authorized agent of a government agency may have a sixth level of code that is shares with no one—and which no one even might know exists—that that the agency or agent uses surreptitiously to look for counterfeiting based upon illegal transmission of knowledge from the highest level of security.

These currency and other secure documents are also an efficient instruments for delegating authority from one agency to another. For example the Federal Government may delegate to a printer the authority to print currency simply by transmitting certain secret information and other authorization codes to that printer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A system for providing a secure document, the system including: a computer network including a computer and an RFID transponder, the computer having a database, and the database containing a first authorization key and at least one additional authorization key; the secure document, the secure document including an integrated RFID circuit coupled with a flexible substrate; the flexible substrate having a surface, the surface visibly presenting an information; the integrated RFID circuit coupled with the substrate, and the integrated RFID circuit having a durable memory, a controller, and a data security circuit; the durable memory including an information storage sector and a protected sector, the information storage sector having a record of at least a portion of the information, and the protected sector having at least one datum not recorded within the information of the flexible substrate; the controller coupled with the durable memory and the data security circuit, and the controller for enabling access to the durable memory by the RFID transponder as authorized by the data security circuit; and the data security circuit for denying authority to the controller to execute instructions received in a message, where the message is not formatted at least partially in mathematical relationship to the first authorization key, wherein different authorization keys are provided to different parties to form a hierarchy of access to various portions of the information stored within the durable memory.

2. The system of claim 1, the system further comprising a printer, the printer communicatively coupled with the computer and the printer for adding visible information to the surface of the flexible substrate.

3. The system of claim 2, wherein the secure document is a personal check.

4. The system of claim 2, wherein the secure document is an airline ticket.

5. The system of claim 2, wherein the durable memory stores information related to a travel destination.

6. The system of claim 2, wherein the durable memory stores information related to an airline flight.

7. The system of claim 2, wherein the durable memory stores information related to a price of an airline ticket.

8. The system of claim 2, wherein the durable memory stores information related to a coupon.

9. The system of claim 8, wherein the durable memory stores information related to a manufacturer.

10. The system of claim 8, wherein the durable memory stores information related to a product identifier.

11. The system of claim 8, wherein the durable memory stores information related to a redemption value of the coupon.

12. The system of claim 1, wherein the first authorization key is at least partially computed on the basis of biometric data.

13. The system of claim 1, wherein the message is a revocation of a validity state of the secure document.

14. The system of claim 1, wherein the secure document is a payroll check.

15. The system of claim 1, wherein the secure document is a certified check.

16. The system of claim 1, wherein the secure document is a cashier's check.

17. The system of claim 1, wherein the secure document is a note of currency issued by a governmental authority.

18. The system of claim 1, the system further comprising: a plurality of authorization keys, the plurality of authorization keys stored within the durable memory and the plurality of authorization keys stored within at least one data storage device communicatively coupled with the computer network; and the plurality of authorization keys arranged within a hierarchy, wherein the data security circuit authorizes the controller to execute an instruction received within a message, and the data security circuit limits a scope of execution of the instruction in light of the position of the at least one of the plurality of authorization keys within the hierarchy, wherein different authorization keys are provided to different parties to form a hierarchy of access to various sectors of protected information.

19. The system of claim 1, wherein the first authorization key that includes a checksum, the checksum computed upon the basis of at least a portion of the information printed on said document.

20. The system of claim 19, wherein the checksum is computed upon the basis of at least one datum stored within the integrated RFID circuit and at least a portion of the information printed on the secure document.

21. The system of claim 1, wherein the durable memory further comprises an Electronic Product Code.

22. The system of claim 1, wherein the durable memory further comprises a record of an Electronic Product Code.

23. A secure document system comprising: a device comprising a flexible substrate coupled with an integrated circuit; means for printing information onto a flexible substrate; the integrated circuit including a durable memory storing digital data; and the durable memory further storing at least two authorization keys, wherein at least one of the at least two authorization keys are written into the durable memory at approximately the time that visible information is added to the flexible substrate, the integrated circuit including a circuit that allows external access to certain portions or the stored digital data only to interrogators communicating the requisite authorization key or keys wherein different authorization keys are provided to different parties to form a hierarchy of access to various sectors of protected information.

24. The system of claim 23, wherein the printer further comprises an RFID transmitter, the transmitter using the authorization key or keys to gain access to at least one section of the durable memory.

25. The system of claim 23, wherein the digital data includes a unique identification number.

26. The system of claim 23, wherein the digital data includes a portion of the information that is printed on the flexible substrate.

27. The system of claim 23, wherein the device is a form of currency document or other monetary instrument.

28. The system of claim 23, wherein the device is a personal, certified, payroll, or other form of check.

29. The device of claim 23, wherein the device is an airline ticket.

30. The system of claim 23, wherein the durable memory also includes other information about the ticket such as destination, a unique identity number, flight number, and cost of the ticket.

31. The system of claim 23, wherein the device is a coupon.

32. The system of claim 31, where the durable memory also includes additional information about the coupon such as the manufacturer of the coupon product, a unique identity number, or the redemption value of the coupon.

33. A system for providing a secure document, the system including: a computer network including a computer and an RFID transponder, the computer having a database, and the database containing at least two different authorization keys; a secure document, the secure document including an integrated RFID circuit coupled with a flexible substrate; the flexible substrate having a surface, the surface visibly presenting an information; the integrated RFID circuit coupled with the substrate, and the integrated RFID circuit having a durable memory, a controller and a data security circuit; the durable memory including at least two protected sectors, the each protected sector containing information not contained in any of the other sectors; and the controller coupled with the durable memory and the data security circuit, and the controller for enabling access to the durable memory by the RFID transponder only when authorized by the data security circuit in response to the presentation to the data security circuit of data and instructions that have been encoded with one of a plurality authorization keys, wherein different authorization keys are provided to different parties to enable a hierarchy of access to various sectors of protected information.

34. The method of claim 33, wherein the information stored in the durable memory comprises a biometric information and the biometric information is authenticated via the computer network by comparison of the biometric information with remote information stored in a remote database of the computer network.

* * * * *